(12) United States Patent
Mepsted et al.

(10) Patent No.: US 8,932,545 B2
(45) Date of Patent: Jan. 13, 2015

(54) SYNTHESIS OF METAL COMPOUNDS (75) Inventors: Gary Owen Mepsted, Southhampton (GB); Emmanuel Imasuen Eweka, Southhampton (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 13/120,364

(22) PCT Filed: Oct. 19, 2009

(86) PCT No.: PCT/GB2009/002485
§ 371 (c)(1),
(2), (4) Date: Mar. 22, 2011

(87) PCT Pub. No.: WO2010/046629
PCT Pub. Date: Apr. 29, 2010

(65) Prior Publication Data
US 2011/0171095 A1 Jul. 14, 2011

(30) Foreign Application Priority Data

Oct. 20, 2008 (GB) .................................. 0819144.7
Oct. 20, 2008 (GB) .................................. 0819145.4

(51) Int. Cl.
*C01B 25/00* (2006.01)
*C01B 25/45* (2006.01)
*C01B 33/20* (2006.01)
*C01B 35/12* (2006.01)
*C01G 45/12* (2006.01)
*C01G 51/00* (2006.01)
*C01G 53/00* (2006.01)
*H01M 4/525* (2010.01)
*H01M 4/58* (2010.01)

(52) U.S. Cl.
CPC .............. *C01B 25/45* (2013.01); *C01B 25/453* (2013.01); *C01B 33/20* (2013.01); *C01B 35/128* (2013.01); *C01G 45/1228* (2013.01); *C01G 51/42* (2013.01); *C01G 51/50* (2013.01); *C01G 53/50* (2013.01); *H01M 4/525* (2013.01); *H01M 4/5825* (2013.01); *C01P 2002/52* (2013.01); *C01P 2002/72* (2013.01); *C01P 2002/76* (2013.01); *C01P 2004/04* (2013.01); *C01P 2006/12* (2013.01); *C01P 2006/16* (2013.01); *C01P 2006/40* (2013.01); *Y02E 60/122* (2013.01)
USPC ........ 423/179.5; 423/277; 423/306; 423/326; 423/594.2; 423/594.4; 423/594.6; 423/599; 423/600

(58) Field of Classification Search
USPC ........ 423/179.5, 277, 306, 326, 594.2, 594.4, 423/594.6, 599, 600
See application file for complete search history.

(56) References Cited

U.S. PATENT DOCUMENTS

| 6,503,382 B1 | 1/2003 | Bartlett et al. |
| 6,558,847 B1 | 5/2003 | Kawakami et al. |
| 6,615,642 B2 | 9/2003 | Poblete |
| 2008/0003503 A1* | 1/2008 | Kawakami et al. ........ 429/231.5 |

FOREIGN PATENT DOCUMENTS

| JP | 2005-060181 | 3/2005 |
| WO | WO 99/00536 | 1/1999 |
| WO | WO 99/31745 | 6/1999 |
| WO | 99/59218 | * 11/1999 |
| WO | WO 2004/054015 | 6/2004 |
| WO | WO 2004/054016 | 6/2004 |
| WO | WO2004/063742 | 7/2004 |
| WO | WO 2005/101548 | 10/2005 |
| WO | WO 2008/029160 | 3/2008 |
| WO | WO 2008/050105 | 5/2008 |
| WO | 2008/106991 | * 9/2008 |

OTHER PUBLICATIONS

Translation of JP 2005-060181, pp. 1-16, Mar. 2005.*
Hahn et al, "Nano-size LiCoO2 powder prepared by sol-gel method", Proceedings of the Ninth Asia Pacific Physics Conference (9th APPC), Hanoi, Vietnam, Oct. 25-31, 2004.
Hahn et al, "Magnetic and electrochemical properties of nano-size LiCoO2 powder prepared by sol-gel method", Proceedings of the Eighth German-Vietnamese Seminar on Physics and Engineering, Erlangen, Apr. 3-8, 2005.
Zhao et al., "Investigation of high-rate spherical LiCo02 with mesoporous structures via self-assembly in microemulsion" Electrochemical and solid-state letters (2008), 11(3), A30-A33.
Jiao et al., "Synthesis of nanowire and mesoporous low temperature LiCo02 by a post-templating reaction", Angew. Chem.Int.Ed (2005), 44, 6550-6553.
Choi et al., "Surfactant based sol-gel approach to nanostructured LiFePO4 for high rate Li-ion batteries", Journal of Power Sources, vol. 163, No. 2, Dec. 22, 2006, 1064-1069.
Kresge et al, "Ordered mesoporous molecular sieves synthesizes by a liquid-crystal template mechanism", Nature Publishing Group, vol. 359, No. 6397, Oct. 22, 1992, 710-712.

(Continued)

*Primary Examiner* — Steven Bos
(74) *Attorney, Agent, or Firm* — McDonnell Boehnen Hulbert & Berghoff LLP (57) ABSTRACT

A method is provided for the synthesis of a mesoporous lithium transition metal compound, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous product. The mesoporous product can be an oxide, a phosphate, a borate or a silicate and optionally, an additional phosphate, borate or silicate reagent can be added at step (i). The reaction mixture can comprise an optional chelating agent and preferably, the reaction conditions at steps (i) and (ii) are controlled so as to prevent destabilization of the liquid crystal phase. The invention is particularly suitable for producing mesoporous lithium cobalt oxide and lithium iron phosphate. The method can be used to synthesize mesoporous lithium cobalt oxide having a specific surface area in excess of 10 m²/g, preferably 15 m²/g or more.

25 Claims, 10 Drawing Sheets

(56) References Cited

OTHER PUBLICATIONS

Yang et al, "Generalisec syntheses of large-pore mesoporous metal oxides with semicrystalline frameworks", Nature Publishing Group, vol. 396, Nov. 12, 1998, 152-155.

Yu et al., "Preparation and characterization of mesoporous LiFePO 4 /C microsphere by spray drying assisted template method", Journal of Power Sources, vol. 189, No. 1, Apr. 1, 2009, 794-797.

Meligrana et al., "Hydrothermal synthesis of high surface LiFePO4 powders as cathode for Li-ion cells", Journal of Power Sources, vol. 160, No. 1, Sep. 29, 2006, 516-522.

Santos-Pena et al, "Electrochemical properties of mesoporous iron phosphate in lithium batteries" Journal of Solid State Electrochemistry—Current Research and Development in Science and Technology, vol. 10, No. 1, Jan. 1, 2006, 1-9.

Doherty et al, "Colloidal Crystal Templating to Produce Hierarchically Porous LiFePO4 Electrode Materials for High Power Lithium Ion Batteries", Chemistry of Materials, vol. 21, No. 13, Jul. 14, 2009, 2895-2903.

First Official Action issued by the Japanese Patent Office in Japanese patent application No. 2011-531556, mailed Jun. 4, 2013.

\* cited by examiner

SYNTHESIS OF METAL COMPOUNDS

FIELD OF THE INVENTION

The present invention relates to an improved method for the production of materials for lithium cells including supercapacitors and batteries. The invention relates especially to the production of materials suitable for lithium secondary batteries, specifically mesoporous lithium transition metal compounds, more especially to the production of mesoporous lithium transition metal oxides and phosphates, and even more especially to the production of mesoporous lithium cobalt oxides and lithium iron phosphate. The invention also relates to materials formed from the method.

BACKGROUND OF THE INVENTION

Lithium secondary batteries are an important source of portable DC power and, despite recent developments in fuel cells, are likely to remain so for many years. Portable electronic and electrical systems increasingly require high-power, compact, durable power sources for effective performance and thus, improved portable power sources are required. Of particular interest are high-energy lithium-ion batteries that can be recharged in a fraction of the time required for existing systems and also have improved battery cycle life.

One way to achieve the desired increase in performance is to use an improved active cathode material. It is known to use lithium transition metal oxides as high performance active cathode materials for secondary lithium batteries and lithium cobalt oxide is one of the most commonly used commercial materials. Another material of interest is lithium iron phosphate, but lithium iron phosphate synthesised in bulk has a high electrical resistance. This is undesirable for high power applications and necessitates incorporation of carbon into the electrode material to increase its conductivity and hence, rate capability.

Battery electrodes are typically fabricated by coating a paste comprising the active cathode material, binder and conductive carbon onto a current collector such as aluminium foil. The active material is the main component of the electrode, providing the required electrochemical capacity. The binder provides inter-particle connectivity and adherence to the current collector, while the conductive carbon boosts the level of electronic conductivity for the electrode reaction. The size of the active material particles is crucial for fabrication of uniform and adherent coatings, as well as for the desired level of electrode performance, and it is well known that large particles not only limit the thickness of the electrode to high values, but also result in uneven coatings. With regard to electrode performance, large particles and thick coatings limit the rate at which lithium ions can diffuse in and out of the electrode during charge and discharge and hence, limit the power/rate capability of the electrode.

During the charge and discharge of lithium ion batteries, lithium ions move in and out of the active cathode material particles causing them to expand and contract in the process. The repeated expansion and contraction of particles with continuous cycling gradually results in loss of electrical contact between particles and a consequent increase in the resistance of the electrode. In turn, the increase in resistance results in poor utilisation of the electrode because charge and discharge cut-off voltages are attained prematurely before all the capacity can be extracted. This is a phenomenon known as 'capacity fade'.

Thus, for batteries to exhibit high rate, long cycle life and good utilisation, it is desirable that battery electrode materials are composed of small particles having a high porosity. This results in a large active surface area for the electrode and enables very thin electrode coatings to be fabricated. High surface area (measured as specific surface area) also promotes fast electrode reactions, thereby enhancing rate performance and power capability.

Traditional methods for achieving high surface area battery electrode materials include ball milling to achieve small particle size, and pyrolysis or solid state routes to obtain porous materials. These methods tend to suffer from a number of disadvantages, however, including agglomeration of smaller particles, expense or being unsuitable for scale-up. Compatibility with existing manufacturing processes for battery electrodes can also be a problem.

Alternatively, lithium transition metal oxides can be synthesised directly as nanoparticles. One known method of producing nanoparticles of a lithium transition metal oxide, for example, is by direct solution precipitation of a single phase metal hydroxide or a multi-phase mixed metal hydroxide, followed by a calcining step which converts the hydroxide or hydroxides to a respective oxide or compound oxide product. Another known method of producing nanoparticles of lithium transition metal oxides is by solution sol-gel synthesis and, by way of example, Hahn et al (Proc. $9^{th}$ Asia Pacific Physics Conference, Hanoi, Vietnam, Oct. 25-31, 2004) describes the reaction of lithium nitrate with cobalt nitrate in the presence of a citric acid reaction agent to produce lithium cobalt oxide powder having a particle size around 100 nm. Lithium cobalt oxide nanomaterials produced by the aforementioned methods, however, tend to have an upper achievable surface area limit of about 5 $m^2/g$.

SUMMARY OF THE INVENTION

According to a first aspect of the present invention there is provided a method for the synthesis of a mesoporous lithium transition metal compound, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous product.

The lithium salt and one or more transition metal salts can form a polymeric metal oxide network at step (ii), thereby forming a mesoporous lithium transition metal oxide product.

Alternatively, the lithium salt and one or more transition metal salts can form a polymeric metal phosphorus oxygen network at step (ii), thereby forming a mesoporous lithium transition metal phosphate product. An additional phosphate reagent such as, for example, ammonium dihydrogen phosphate, may be required for the formation of a phosphate based sol-gel. In a preferred embodiment, a lithium salt is reacted with an iron salt and a phosphate salt, preferably under acidic conditions, so as to produce mesoporous $LiFePO_4$. Preferably, the lithium salt is lithium nitrate, the iron salt is ferrous oxalate dihydrate or an iron nitrate (such as, for example, $Fe(NO_3)_3 \cdot 9H_2O$), and the phosphate is ammonium dihydrogen phosphate. Alternatively, an iron salt (such as, for example, Fe(III) citrate) can be reacted with a lithium phosphate (such as, for example, $LiH_2PO_4$) without an additional phosphate reagent to form the polymeric metal phosphorus oxygen network. Optionally, the reaction mixture comprises nitric acid. Advantageously, it has been found that the conductivity of the LiFePO$_4$ material can be significantly enhanced by imparting mesoporosity thereto.

The invention can also be used to synthesise lithium transition metal borates and silicates such as, for example, LiMBO$_3$ (where M can be Fe, Co or Mn) and Li$_2$MSiO$_4$ (where M can be Fe or Mn). In this case, the lithium salt and one or more transition metal salts form either a polymeric metal boron oxygen or polymeric metal silicon oxygen network at step (ii), thereby forming a mesoporous lithium transition metal borate or silicate product. Again, an additional borate or silicate reagent may be required to form the sol-gel, and the skilled person will be aware of suitable sol-gel reagents.

Like lithium iron phosphate (LiFePO$_4$), LiMBO$_3$ (where M can be Fe, Co or Mn) and Li$_2$MSiO$_4$ (where M can be Fe or Mn) are potential high energy density cathode materials with generally poor electrical conductivity. By synthesising the materials according to the method of the invention, it is possible to boost their conductivity and enable their use in lithium batteries.

In all cases, the method of the invention produces a mesoporous lithium transition metal compound by combining sol-gel synthesis with liquid crystal templating. The result is an easily conducted, convenient, low temperature process for producing a single-phase, mesoporous lithium transition metal compound.

The invention is now described with particular reference to the production of mesoporous lithium cobalt oxides. However, the teaching can be applied more generally by the skilled person to the lithium transition metal compounds mentioned above. By lithium cobalt oxides is meant either lithium cobalt oxide (LiCoO$_2$) or lithium cobalt oxide comprising one or more additional transitional metal inclusions (such as, for example, LiCoMnO$_2$, LiCoNiO, LiCoAlO$_2$ and LiNi$_{0.33}$Co$_{0.33}$Mn$_{0.33}$O$_2$)— hereinafter referred to as a compound lithium cobalt oxide. In both cases, the one or more transition metal salts includes a cobalt salt. In order to produce LiCoO$_2$, a lithium salt is reacted with a cobalt salt at step (i). In order to produce a compound lithium cobalt oxide, however, a lithium salt is reacted with a cobalt salt and one or more further transition metal salts, the one or more further salts preferably comprising a transition metal selected from the group consisting of Ni, Mn and Al. More preferably, the reagents are selected to form a compound lithium cobalt oxide product selected from the group consisting of LiCoMnO$_2$, LiCoNiO, LiCoAlO$_2$ and LiNi$_{0.33}$Co$_{0.33}$Mn$_{0.33}$O$_2$.

It will be understood that the chemical formulae expressed above are not intended to be strictly limiting, and will cover any non-stoichiometric variants.

Mesoporous lithium cobalt oxides offer the potential for developing lithium-ion batteries having high energy and also a high recharge/discharge rate capability, parameters which are generally mutually exclusive in commercial batteries. An additional benefit of using a mesoporous lithium cobalt oxide-based cathode material is improved battery cycle life, because the primary mechanism for failure (increasing electronic resistance in the cathode through physical, degradation) is significantly retarded by the mesoporosity.

Conventionally, pore size ranges in porous materials are defined as follows; microporous less than 5 nm, mesoporous 5-50 nm, nanoporous 50-100 nm and macroporous greater than 100 nm. However, these definitions are not meant to be interpreted strictly because the range and long-range ordering may vary slightly. Accordingly, mesoporous materials produced by the method of the invention may have some pores larger than 50 nm and some pores smaller than 5 nm.

The method of the invention can produce single phase mesoporous lithium transition metal oxides, preferably mesoporous lithium cobalt oxides. Lithium cobalt oxide powders manufactured according to the invention have been characterised by X-ray diffraction (XRD) analysis, transmission electron microscopy (TEM) and Brunauer-Emmett-Teller (BET) surface area analysis, and have been shown to be mesoporous and to have specific surface areas in excess of 10 m$^2$/g, and typically 15 m$^2$/g or more. In one Example, a BET surface area of 20 m$^2$ µg was recorded.

Liquid crystal templating uses a high concentration of surfactant in a reaction mixture to form an ordered liquid crystal phase comprising self-assembled arrays of regularly spaced cylinders. The spacing of the cylinders, and hence pore size of the final templated product, is controlled by the chain length of the chosen surfactant. For the hexagonal phase, which is the preferred liquid crystal phase for the method of the present invention, the cylinders are arranged in a hexagonal array and configured such that the hydrophobic part of the surfactant is concentrated towards the interior of the cylinder and the hydrophilic, generally aqueous region is concentrated at the exterior. When properly controlled, liquid crystal templating provides a highly ordered template structure, around which a material can be synthesised. Typically, liquid crystal templating makes use of a lyotropic liquid crystalline phase and accordingly, is conducted at higher surfactant concentrations than other, more loosely ordered surfactant-based techniques such as micellar templating.

The sol-gel process is a low temperature method which can be used for the synthesis of metal oxide powders, including lithium transition metal oxide powders, from inorganic and/or organic metal salt precursors, and usually takes place under aqueous conditions. In the sol-gel process, a metal oxide network is produced by first forming a colloidal suspension (a sol) from the precursors and then allowing the sol to undergo hydrolysis and condensation reactions to form a solid phase -M-O-M- polymer network in a continuous liquid phase (a gel). The gel is subsequently heated to dry the oxide product and, if necessary, to impart the required crystal phase. By using a combination of metal salt precursors, mixed metal oxide sols can be formed containing 2, 3, 4, 5 or even more metal inclusions. Desirable mixed metal oxides for cathode materials include LiCoO$_2$, LiCoMnO$_2$, LiCoNiO, LiCoAlO$_2$ and LiNi$_{0.33}$Co$_{0.33}$Mn$_{0.33}$O$_2$.

The sol-gel process can also be used to synthesise other metal compounds such as, for example, phosphates, borates and silicates. In that case, the polymer network is a metal phosphorus oxygen network, a metal boron oxygen network, a metal silicon oxygen network and so on.

Metal oxide powders produced from a non-templated sol-gel synthesis generally comprise individually dispersed and/or agglomerated sub-micron and/or nanosized particles with a specific surface area less than about 5 m$^2$/g, more typically less than about 1 m$^2$/g. This is because the sol-gel synthesis produces an oxide product which has a small particle size, but limited porosity.

In the method of the invention, a lithium salt is reacted with one or more transitional metal salts in the presence of a surfactant, the surfactant being present in an amount sufficient to form a liquid crystal phase in the reaction mixture. The reaction mixture is heated, and optionally aged, so as to form a sol-gel, thereby forming, in the case of metal oxide synthesis, a polymeric lithium-transition metal oxide network in the hydrophilic domains of the liquid crystal phase. Put another way, the hydrophilic regions of the reaction mixture, typically those regions external to the rods or cylinders in the liquid crystal phase, are used to support the synthesis of a lithium transition metal oxide (—Li—O-M-) network by a sol-gel process. In this way, the inorganic polymeric metal oxide network forms around the surfactant rods, preferably arranged in a hexagonal array, thereby introducing the liquid crystal template into the metal oxide structure. The surfactant is then removed to form the mesoporous oxide product.

Preferably, the one or more transitional metal salts include a cobalt salt, so as to produce $LiCoO_2$ or a compound lithium cobalt oxide, in which case the liquid crystal phase respectively supports the formation of a polymeric —Li—O—Co— network or a —Li—O—Co—O-M- network.

The surfactant can be removed from the sol-gel by any suitable method such as, for example, solvent extraction or thermal decomposition. Removing the surfactant leaves behind an oxide product having a single phase, three-dimensionally connected mesoporous structure.

The synthesised product, preferably a synthesised oxide product, is likely to take, at least in part, an amorphous form. Amorphous materials are generally undesirable for use as battery materials and accordingly, the product is preferably calcined so as to convert the material to the desired crystal phase. Conveniently, the surfactant removal and calcining stages are combined, such that the surfactant is removed by thermal decomposition at a temperature suitable for calcining. In general, temperatures greater than about 400° C. can be used to convert the product to the correct crystal phase, but, as the calcining temperature increases, the inventors have found that there is an increasing likelihood of pore collapse in the mesoporous product. This gives rise to a corresponding decrease in the achievable surface area enhancement. It is desirable, therefore, to use a calcining temperature which is as low as possible (to maintain pore integrity) whilst still being high enough to obtain the correct crystallinity. For the liquid crystal templated synthesis of battery grade $LiCoO_2$, the preferred calcining temperature lies in the range 400° C. to 700° C., more preferably 400° C. to 600° C. For the synthesis of lithium iron phosphate, the calcining temperature preferably lies in the range 450° C. to 700° C. and more preferably in the range 450° C. to 650° C.

In order to synthesise a material successfully by a liquid crystal templating method, it is generally important to form the desired liquid crystal phase in the reaction mixture and then maintain that phase during substantially all of the synthesis reaction. If the reaction conditions are not carefully controlled, such as, for example, by removing undesirable side products, and/or by maintaining the surfactant concentration in a desired range at steps (i) and (ii), the liquid crystal phase can become destabilised. Destabilisation of the liquid crystal phase can in turn result in the formation of an undesirable micellular phase, or an even more loosely ordered structure, which is unsuitable for forming a mesoporous product. Instead, the product tends merely to comprise loosely ordered nanoparticles having little or no interconnectivity and low specific surface area.

In the method of the invention, therefore, it is desirable to control the reaction conditions at steps (i) and (ii) so as to prevent destabilisation of the liquid crystal phase, and ideally the reaction conditions are controlled to prevent phase destabilisation throughout all, or substantially all, of steps (i) and (ii). It can be particularly important to control the concentration of surfactant in the reaction mixture such that a stable liquid crystal phase—preferably a stable hexagonal phase—is maintained.

A typical surfactant concentration for producing a stable liquid crystal phase, particularly the preferred hexagonal liquid crystal phase, is 40-60 wt %, and, in view of the above, the surfactant concentration is preferably maintained in that range throughout all, or substantially all, of steps (i) and (ii). More preferably, the surfactant concentration lies in the range 45-55 wt % and even more preferably the surfactant concentration is about 50 wt %. Again, the surfactant concentration is preferably maintained in those ranges throughout all, or substantially all, of steps (i) and (ii), that is, throughout the formation of the sol-gel inorganic polymeric network.

An advantage of the method of the invention is that it does not involve the further addition of reagents to the reaction mixture. In other words, once the metal salts, surfactant and optional reagents (such as the above-mentioned phosphate, borate or silicate, and/or below-mentioned chelating agent) have been combined to form a reaction mixture—preferably an aqueous reaction mixture—no further reagents need to be added during the synthesis and, as a result, the surfactant concentration is not subsequently diluted. This not only provides a simple and straightforward synthesis method, but also means that the main mechanism for possible changes in the surfactant concentration is water loss during steps (i) and (ii). Accordingly, the surfactant concentration (and hence, the liquid crystal phase behaviour) in the reaction mixture can be controlled, simply and effectively, by minimising water loss during those steps.

One preferred way of minimising water loss is to control the reaction temperature such that the liquid crystal phase is prevented from drying out and hence, undergoing phase destabilisation. The conventional sol-gel synthesis of metal oxides can proceed at any temperature in the range 60° C. to 80° C., but lower temperatures in the range 50° C. to 60° are generally suitable for the method of the invention. More preferably, the reaction mixture is heated to a temperature in the range 55° C. to 60° C., which is below the usual non-templated reaction temperature range of 70° C. to 80° C. for lithium cobalt oxide. It has been found by the inventors that a reaction temperature in the range 55° C. to 60° C. provides an appropriate balance between promoting the hydrolysis and condensation reactions of the sol-gel synthesis, and reducing water loss from the reaction mixture. In order to compensate for the lower reaction temperature, the templated sol-gel synthesis according to the invention is preferably allowed to proceed for longer than the corresponding non-templated, prior art synthesis. Beneficially, this optional aging process can produce a better, more interconnected and densified polymeric network which is less prone to collapse in subsequent processing steps (particularly the optional calcining step).

Alternatively, or in addition to controlling the reaction temperature, water loss can be reduced by controlling the escape of water vapour generated during steps (i) and (ii). Accordingly, the templated sol-gel reaction is optionally conducted in a sealed or partially sealed container or reaction vessel so as to control the extent of water loss, more preferably substantially preventing said loss.

In order to act as a templating agent suitable for the present invention, the surfactant generally needs to be capable of forming a liquid crystal phase comprising rods or cylinders and more preferably capable of forming the $H_1$ hexagonal phase. Many surfactants are known to those skilled in the art, and readily available from commercial sources, and any surfactant which provides the desired liquid crystal phase behaviour in the reaction mixture can be used in the method of the invention. Either ionic or non-ionic surfactants may be suitable; possible ionic surfactants include cetyl dimethyl ethyl ammonium bromide or cetyl trimethylammonium bromide (CTAB), and possible non-ionic surfactants include block copolymers based on ethylene oxide and propylene oxide (commonly known as Pluronic® surfactants), polyoxyethylene cetyl ether or octaethylene ether (OEE). It is preferred, however, that a surfactant is selected which is chemically inert and does not take part in the sol-gel reaction. In that regard, lithiated surfactants (such as, for example, lauryl ether lithium acetate) have been found to be unsuitable for use in the method of the invention, due their undesirable destabilising effect on the liquid crystal phase in the reaction mixture.

The surfactant preferably needs to be capable of forming the required liquid crystal phase over the temperature range of the templated sol-gel synthesis. It is also advantageous that a surfactant is selected having a chain length (or range of chain lengths) which is capable of providing a repeat distance of about 5 to 10 nm, preferably 7 to 8 nm, in the ordered template.

Preferably, the sol-gel reaction takes place under aqueous conditions, and ideally takes place under conditions which exclude solvents capable of destabilising the liquid crystal phase. It is generally desirable to avoid the use of organic solvents such as ethanol and methanol because they have been, found to disrupt the liquid crystal phase, thereby leading to a total or partial collapse of the template structure and hence, failure to produce a product having the desired mesoporosity.

Optionally, the reaction mixture comprises a chelating agent so as to enhance mixing of the reagents, maximise the surface area for the reacting precursors and prevent premature precipitation of metal oxides (which leads to the formation of an undesirable multi-phase product). When lithium nitrate is reacted with cobalt nitrate to produce a Li/O/Co-based sol, for example, an additional chelating agent is generally required in the reaction mixture.

A separate chelating agent is not always necessary, however. When lithium acetate is reacted with cobalt acetate to produce a Li/O/Co-based sol-gel, for example, the acetate counter ion can itself act as a chelating agent, thereby obviating the need for another reagent (in other words, the acetate self-chelates).

In general, a chelating agent tends to be desirable where the sol-gel reagents themselves possess no chelating properties. In order for a material to act as a chelating agent in the templated sol-gel synthesis of the invention, the material should be capable of chelating in the hydrophilic domain external to the rods or cylinders of the template, rather than the hydrophobic domain within the template. The inventors have unexpectedly found that citric acid and propionic acid can act as chelating agents in the method of the invention, citric acid being preferred due to its low cost and ready availability.

The one or more transition metal salts can comprise an organic anion such as, for example, acetate, carboxylate, citrate or oxalate, or an inorganic anion such as, for example, nitrate, dihydrogen phosphate or phosphate. In some cases the one or more further transition metal salts may comprise different anions, but more often each transition metal reagent will comprise the same anion.

Similarly, the lithium salt can comprise an organic anion such as, for example, acetate, carboxylate, citrate or oxalate, or an inorganic anion such as, for example, nitrate, dihydrogen phosphate or phosphate. Generally (although not necessarily) the lithium salt comprises the same anion as at least one of the one or more transition metal salts and commonly, the lithium salt and one or more transition metals salts all comprise the same anion. Preferably, the lithium salt and one or more transition metals salts all comprise the same anion and the anion is selected from acetate and nitrate, more preferably nitrate. Thus, $LiCoO_2$ is preferably synthesised from a reaction mixture comprising either lithium acetate and cobalt acetate, or lithium nitrate and cobalt nitrate, and more preferably synthesised from a reaction mixture comprising lithium nitrate and cobalt nitrate. Sol-gel reactions comprising nitrate salts are advantageous for the method of the invention because nitrates generally yield condensation products that are aqueous and alcohol free.

Two examples of preferred sol-gel precursors for $LiFePO_4$ are:

Fe(III) citrate+$LiH_2PO_4$ (prepared from $H_3PO_4$ and $Li_3PO_4$)
$Fe(NO_3)_3 \cdot 9H_2O + NH_4H_2PO_4 + LiNO_3$+citric acid According to a second aspect of the invention, there is provided a method for the synthesis of a mesoporous lithium transition metal oxide, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous oxide product.

According to a third aspect of the invention, there is provided a method for the synthesis of lithium iron phosphate, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous phosphate product. Preferably, the lithium salt is a phosphate salt. Alternatively, an additional phosphate salt can be added at step (i). In either case, a dihydrogen phosphate is the preferred phosphate salt.

According to a fourth aspect of the invention, there is provided a mesoporous lithium transition metal oxide material, preferably a lithium cobalt oxide material. The mesoporous oxide of the invention preferably has a BET surface area in excess of 10 m$^2$/g, more preferably 15 m$^2$/g or more. In one embodiment, the lithium transition metal oxide is a compound lithium cobalt oxide, preferably selected from the group consisting of $LiCoMnO_2$, $LiCoNiO$, $LiCoAlO_2$ and $LiNi_{0.33}Co_{0.33}Mn_{0.33}O_2$. In an alternative embodiment, the lithium transition metal oxide is $LiCoO_2$, preferably $LiCoO_2$ having a crystalline structure.

According to a fifth aspect of the invention, there is provided an electrode comprising a mesoporous lithium transition material as described above.

According to a sixth aspect of the invention, there is provided a cell comprising a mesoporous lithium transition material as described above. Preferably the cell is a lithium secondary battery or a supercapacitor.

Preferred features of the second, third, fourth, fifth and sixth aspects of the invention are as described above in relation to the first aspect.

DESCRIPTION OF THE DRAWINGS

Specific embodiments of the present invention will now be described, with reference to the accompanying drawings, in which.

DESCRIPTION OF THE INVENTION

Figure 1:
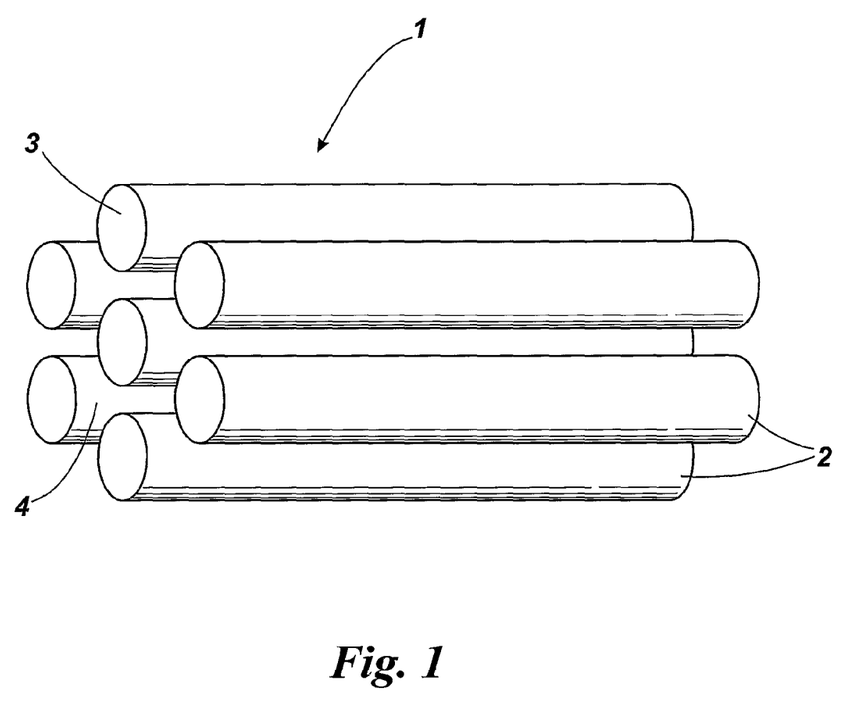
FIG. 1 is a schematic representation of a liquid crystal hexagonal column array.

FIG. 1 is a schematic representation of a liquid crystal hexagonal column array 1 comprising cylinders or columns 2 having a hydrophobic inner region 3 and a hydrophilic outer region 4 capable of supporting an aqueous sol-gel reaction. In the method of the invention, a highly interconnected polymeric metal oxide network forms in the hydrophilic regions 4 around the hexagonal array and, upon removal of the surfactant, the cylindrical morphology remains in the oxide structure.

Liquid Crystal Phase Stability

It is desirable that the liquid crystal phase remains stable during substantially all of the sol-gel synthesis, that is, steps (i) and (ii) of the method of the invention, and over the sol-gel temperature range of 60-80° C. To that end, the stabilities of the preferred hexagonal ($H_1$) liquid crystal phase using two possible surfactants at typical sol-gel reaction temperatures, and in the presence of two sol-gel reagent systems (lithium acetate/cobalt acetate and lithium nitrate/cobalt nitrate), were studied.

The two surfactants used were octaethylene glycol monohexadecyl ether (OEE) (Fluka), which is a high purity, relatively expensive compound, and polyoxyethylene 10 cetyl ether (Brij® 56) (Aldrich), which is a lower cost material.

It was also important to ensure that the presence of metal ions (from the sol-gel reaction mixture) did not destabilise the phase structure and, to that end, the phase behaviour of surfactant/water solutions both with, and without, metal ions was also studied.

In separate experiments the aqueous solutions also contained citric acid as a chelating agent.

Mixtures of aqueous solutions of the metal acetates or nitrates with OEE or Brij® 56 were prepared by addition of the surfactant to the metal ion solution at compositions corresponding to 30, 40, 50 and 60 wt %. The mixtures were heated until the surfactant became liquid (about 40-50° C.) followed by rapid mixing until a homogeneous mixture was obtained. The mixture was transferred to the hot stage assembly of a cross-polarised optical microscope and the initial sample texture was examined, followed by further heating to a maximum temperature of 95° C. Heating above 95° C. caused the mixture to boil, resulting in rapid loss of water and a consequent change in the phase behaviour.

For the nitrate system at 30 wt % OEE, no hexagonal phase was observed. At 40, 50 and 60 wt %, two $H_1$ textures were obtained depending upon the sectional plane that was viewed as a result of the shearing of the material. One texture was the classical "columnar discotic" fan-shaped texture and the other texture was a platelet texture similar to the layered $H_1$ ordered phase observed in calamitic smectic I/F or B phases. Mixtures were made up of the host system at 40, 50 and 60 wt % (i.e. in the absence of the metal nitrates) and the phase textures confirmed as being the same as in the metal ion systems. A contact study of the mixtures exhibiting the two textures demonstrated continuity across the studied temperature range.

Advantageously, the stability of the hexagonal phase was found to be enhanced in the nitrate system compared to the water system and, moreover, not significantly reduced by the addition of citric acid to the mixture.

For the acetate/OEE mixtures, the stability of the hexagonal phase was reduced compared to the host system, but still viable over the temperature range of interest. More complicated phase changes were apparent at surfactant concentrations above 60 wt %, but these were not investigated further because it was the hexagonal phase which was of interest.

The following was observed for the series of mixtures (acetate, nitrate or host) which were made using Brij® 56 instead of OEE. These showed an increase in the temperature stability range of the hexagonal, $H_1$, phase and a reduction in cubic, V1, phase, which was beneficial to the aims of the invention. A 50:50 wt % Brij®56/aqueous solution mixture was found to give the widest temperature stability range (room temperature up to about 95° C.) for the $H_1$ phase and was therefore preferred for all the experiments in the investigation.

The addition of citric acid to the liquid crystal mixtures at temperatures below 95° C. was found to have no effect on the stability of the hexagonal phase. However, the hexagonal phase of the acetate mixtures were generally less thermally stable, with the liquid crystal phase transitions also being less well defined.

In summary, the composition and temperature stability range of the hexagonal phase of the liquid crystal mixture of two surfactants with aqueous solutions of nitrate and acetate salts of lithium and cobalt were successfully determined. A solution containing a commercial, low cost surfactant (Brij® 56) was found to have a wider temperature stability range of the preferred hexagonal phase than a more expensive alternative surfactant (OEE). Moreover, the addition of citric acid to the templating mixture was found to have no effect on the stability of the hexagonal phase.

The hexagonal phase of the acetate mixtures was generally less thermally stable, with the liquid crystal phase transitions also being less well defined. Thus, mixtures comprising nitrate salts of lithium and cobalt were preferred over the acetate salts.

Characterisation of Commercial Lithium Cobalt Oxide

Commercial $LiCoO_2$ was received from the supplier (Pred Materials, Battery Grade) as a fine black powder and examined by XRD analysis, TEM and BET surface area analysis. The sample was prepared for XRD analysis by first grinding to a fine powder with pestle and mortar. TEM samples were examined as powder fragments after being subjected to ultrasonication for a few hours in ethanol in order to obtain fragments that were thin enough for the penetration of the electron beam. BET measurements were carried out on powder as received from the supplier.

Figure 2:
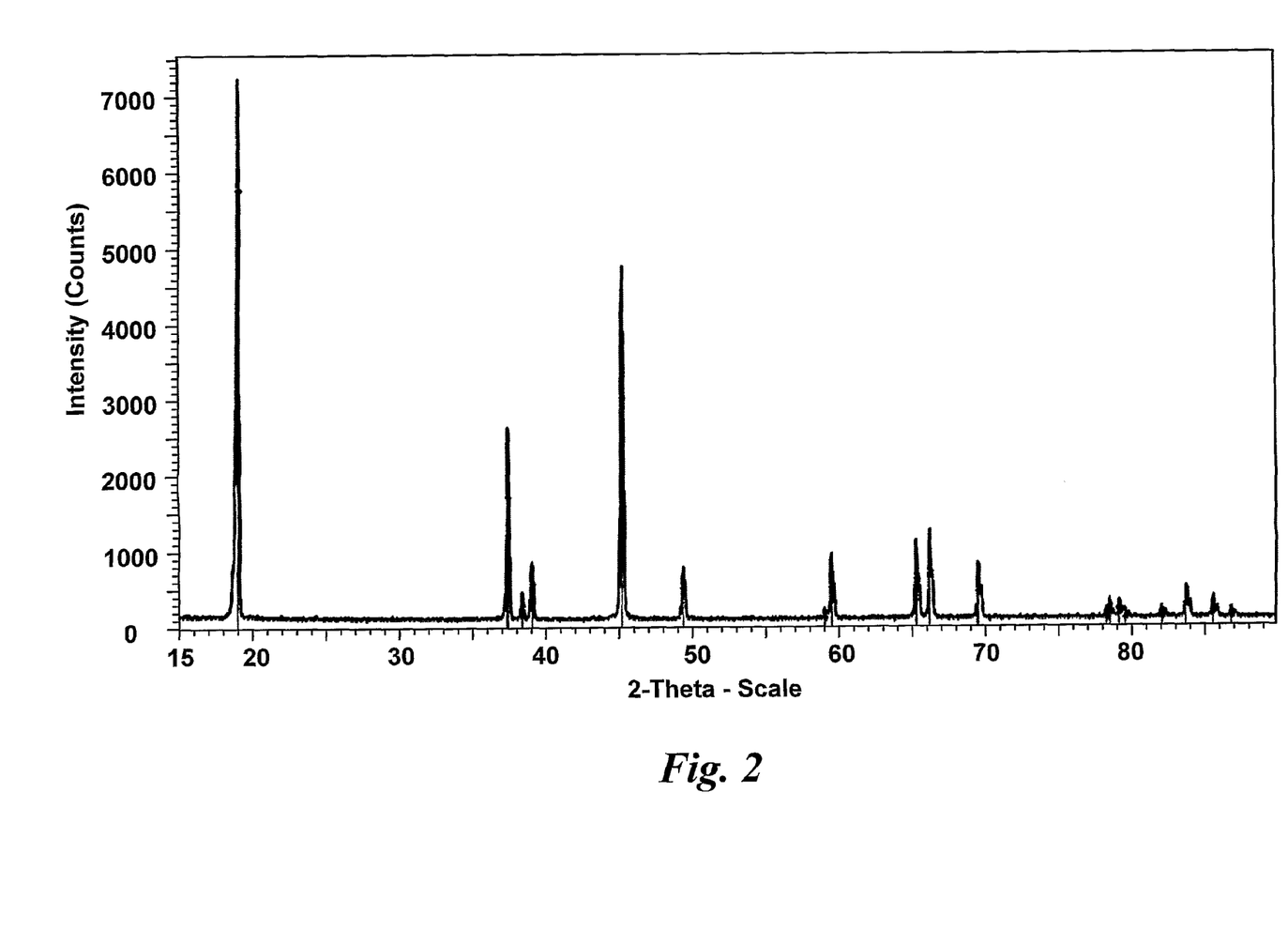
FIG. 2 shows an XRD pattern of commercial $LiCoO_2$.

XRD is a standard technique for identifying crystalline inorganic compounds and often acts to fingerprint a compound. An XRD pattern is unique for a particular compound and consists of diffraction peaks due to reflection from crystal planes. The XRD pattern for commercial battery grade $LiCoO_2$ was compared with standard, crystal pure $LiCoO_2$ and is shown in FIG. 2. In FIG. 2, the XRD peaks for the crystal pure $LiCoO_2$ reference are represented as vertical lines. It can be seen that there is an excellent match (in terms of number of peaks and peak positions) of the peaks from the standard sample with those from the commercial $LiCoO_2$ powder. This confirms that the commercial $LiCoO_2$ powder is standard $LiCoO_2$.

Figure 3A:
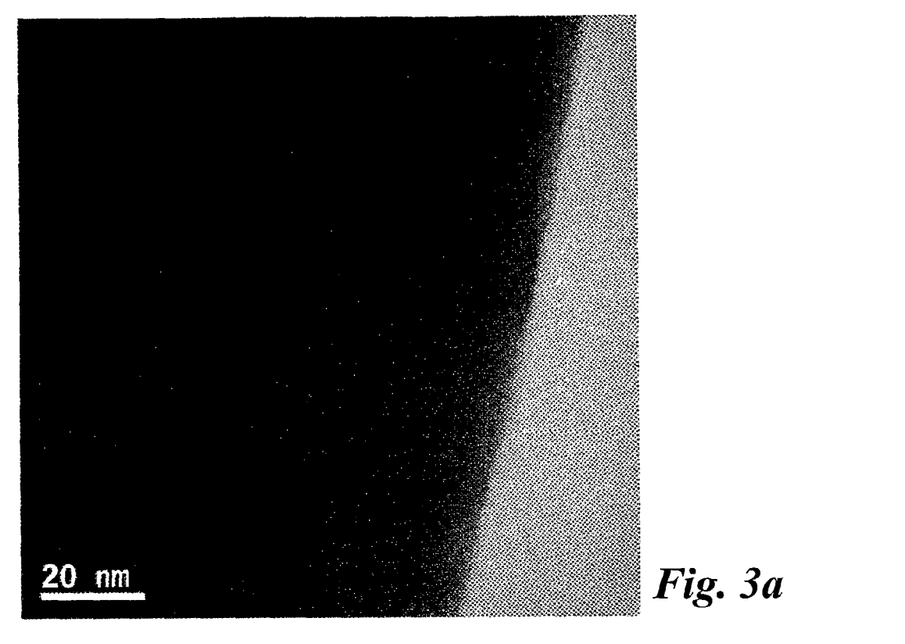
FIGS. 3*a* and 3*b* show TEM micrographs of commercial $LiCoO_2$.
Figure 3B:
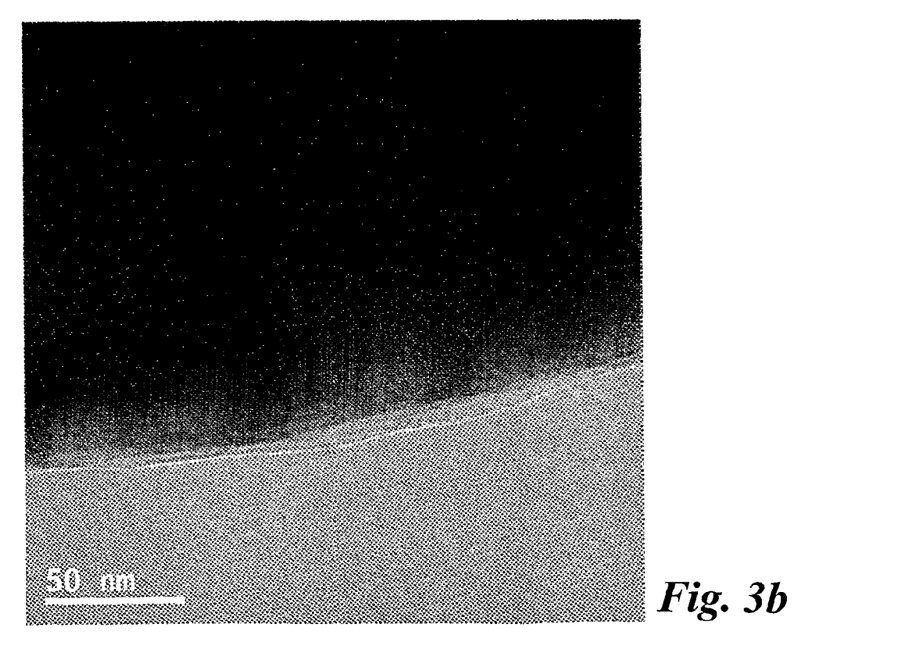

TEM is a high resolution characterisation technique which uses an electron beam to identify pore size and pore structure in high surface area materials with very small pores (<100 nm). If a material is not porous on the nanoscale, then the TEM micrograph will appear as a dark image because the electron beam cannot penetrate the structure. However, for a mesoporous material, the TEM micrograph appears as dark and light regions (light regions are due to beam penetration of pores and dark regions are due to non-penetration of pore walls) and, depending on the regularity of the pore structure and the penetration plane of the beam, as regular patterns with black and white lines or circles. The distance measured between the lines is the diameter of the pores or pore repeat distance and the line width is the thickness of the pore walls. FIGS. 3a and 3b show TEM micrographs of fragments from the commercial powder. The micrographs are featureless and dark indicating a lack of porosity on the mesoscale.

BET surface area analysis is the standard technique used to determine the surface area of a highly porous material. The method relies on nitrogen adsorption and desorption at a particular temperature. Usually, the amount of nitrogen adsorbed or desorbed is directly related to the surface area of the material. The higher the BET surface area, the higher is the surface area and hence porosity of the material. The commercial $LiCoO_2$ material had a BET value of less than 1 $m^2/g$.

Synthesis of Lithium Cobalt Oxide by Non-Templated Sol-Gel Method

A non-templated sol-gel synthesis of $LiCoO_2$ was conducted as a control experiment. An aqueous solution of lithium nitrate (Suprapur, Merck Chemicals International), cobalt nitrate (Suprapur, Merck Chemicals International) and citric acid (Puriss Grade, Fluka Chemie AG) was heated to between 70° C. and 80° C. in an open container with continuous stirring, until a purple to pink crusty gel was formed. The gel was then held at 75° C. for a few hours before being allowed to cool. The product was ground to a fine powder and then calcined at a temperature of 650°-700° C. for 16 hours. A dark grey to black powder was formed. The product was characterised by XRD, BET and TEM using the methods outlined above in respect of the characterisation of commercial lithium cobalt oxide.

An XRD trace was recorded for the non-templated product, which showed a match of peaks with those of the standard sample and confirmed that the product of the non-templated synthesis has a similar single phase structure to that of the commercial $LiCoO_2$.

Figure 4:
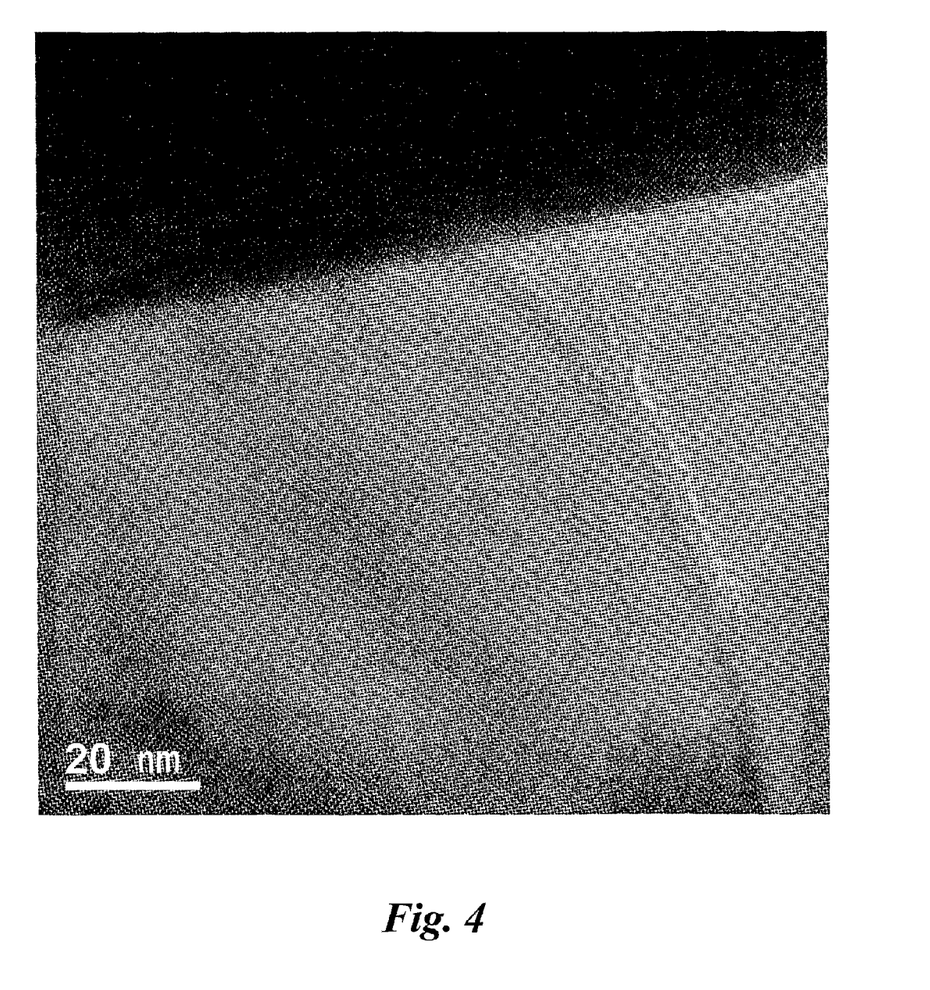
FIG. 4 shows a TEM micrograph of $LiCoO_2$ produced by non-templated sol-gel synthesis.

A TEM micrograph of the $LiCoO_2$ material produced by the non-templated synthesis is shown in FIG. 4. The image is featureless and dark (top region of image) indicating a lack of porosity on the mesoscale.

The powder from the non-templated synthesis had a BET surface area of about 1 $m^2/g$.

Synthesis of Lithium Cobalt Oxide by Templated Sol-Gel Method

A templated sol-gel synthesis of $LiCoO_2$ was conducted according to the invention. An aqueous solution of lithium nitrate, cobalt nitrate and citric acid was heated to between 55° C. and 60° C. in an open container with continuous stirring. The solution was stirred for a further 10 hours to obtain a homogeneous mixture, after which 100 ml of a molten solution of Brij® 56 (Sigma Aldrich Inc.) surfactant was added at 40° C. The mixture was then stirred until a hexagonal liquid crystal phase was formed. The liquid crystal phase mixture, which had the consistency of viscous paste, was then transferred to a sealed sample bottle and heated to 60° C. The mixture was now a viscous liquid, which was stirred for a further 24-36 hours at 60° C. until it changed colour from light to deep purple. Heating was then continued for a few hours and the solution transferred to an alumina crucible where it was allowed to cool. The cooled solid/gel was then transferred to a furnace with constant heating for 16 hours at 600-650° C. The templated sol-gel synthesis was conducted in a sealed container because water loss was observed to lead to the destruction of the hexagonal phase of the liquid crystal and hence, the collapse of the pore structure morphology.

The resulting dark grey to black solid was ground to a fine powder and then characterised by XRD, BET and TEM using the methods outlined above in respect of the characterisation of commercial lithium cobalt oxide.

Figure 5:
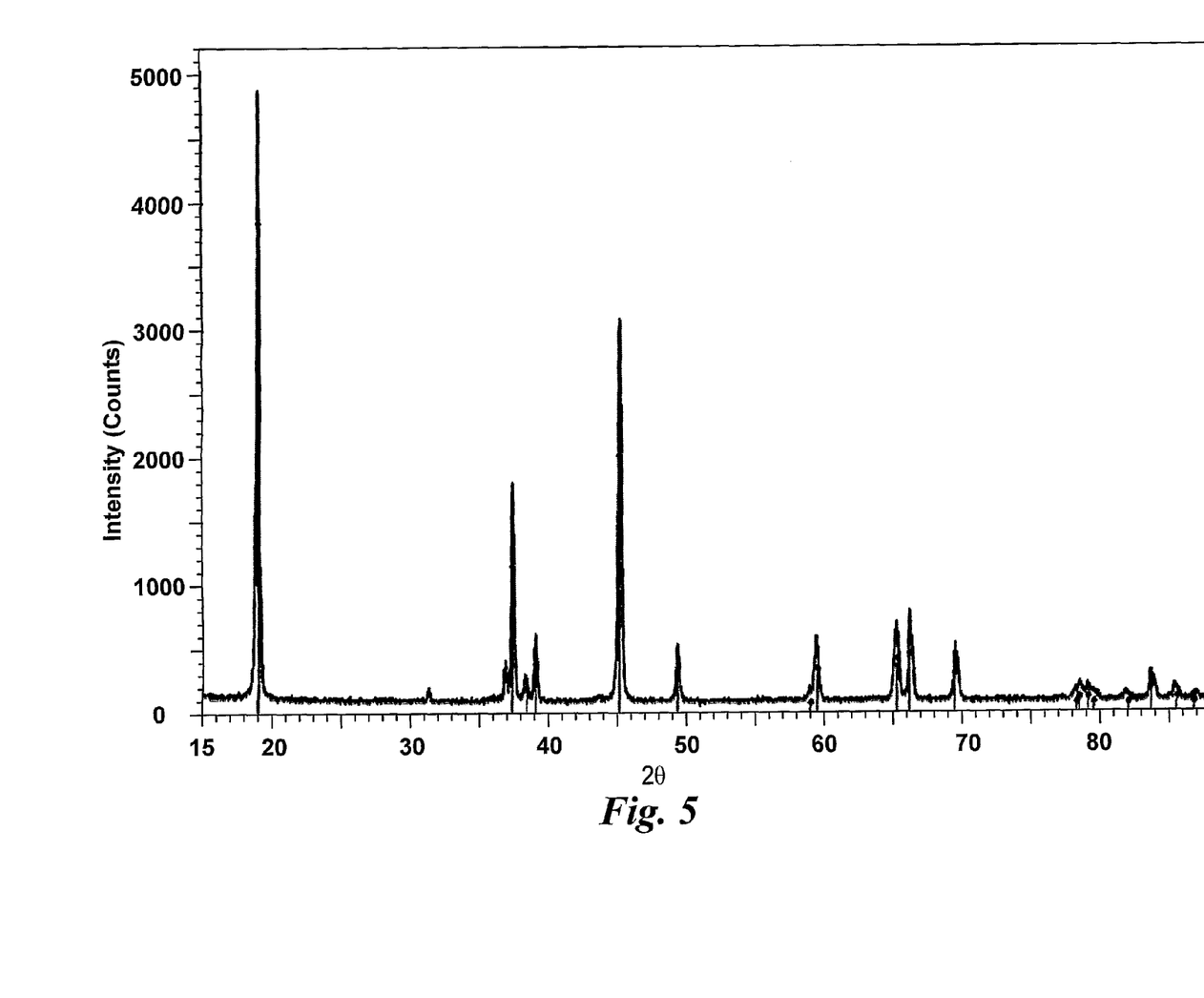
FIG. 5 shows an XRD pattern of $LiCoO_2$ produced by a templated sol-gel synthesis according to the invention.

FIG. 5 shows the XRD trace for the templated product. It can be seen that there is a match of the peaks with those of the standard sample, which confirms that the product of the templated synthesis has a similar structure to that of the $LiCoO_2$ standard and also the commercial $LiCoO_2$.

Figure 6A:
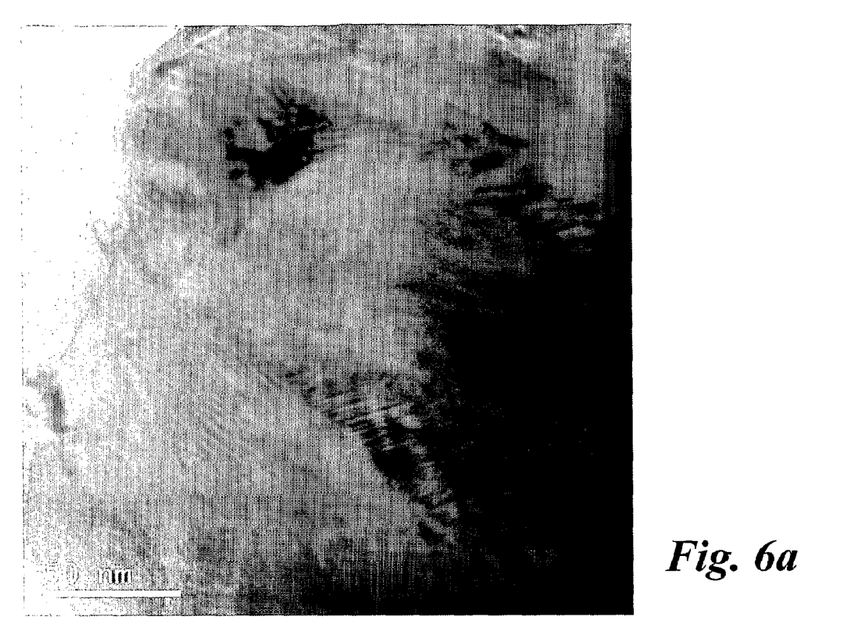
FIGS. 6a and 6b show TEM micrographs of $LiCoO_2$ produced by a templated sol-gel synthesis according to the invention.
Figure 6B:
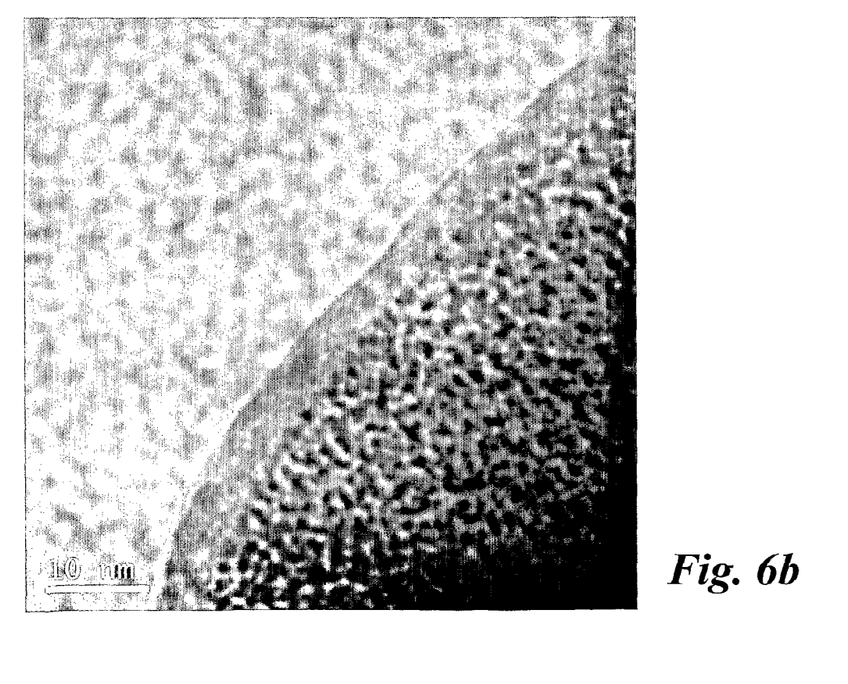

FIGS. 6a and 6b show TEM micrographs for particles produced by the templated synthesis. Both images show evidence of mesoporosity, with regions or clusters of regularly spaced dark and light lines. The line spacing (or pore diameter) and repeat distance are both around 3 nm and the line width (or pore wall thickness) is around 1.5 nm.

The powder from the templated synthesis had a BET surface area of 15.8 $m^2/g$.

The above experiment was repeated several times. In all cases, the BET surface area of the synthesised powder was greater than 10 $m^2/g$ (the lowest recorded value being 13.0 $m^2/g$) and the BET surface area was generally 15 $m^2/g$ or more. In one case, a BET surface area of 20.0 $m^2/g$ was recorded.

In general, therefore, the synthesis of the invention produced powders having a BET surface area of 15 $m^2/g$ or more, while those from the non-templated synthesis and commercial material had values of 1 $m^2/g$, and less than 1 $m^2/g$, respectively. This indicates at least a 15-fold enhancement in the surface area of the powders from the templated synthesis over that of commercial $LiCoO_2$.

In conclusion, XRD analysis confirms that the powder produced by a templated, sol-gel synthesis is $LiCoO_2$. TEM measurements reveal that the $LiCoO_2$ particles are highly mesoporous, with a BET surface area at least 15 times higher than that of commercial battery grade $LiCoO_2$ and material produced by an equivalent non-templated synthesis.

Synthesis of $LiNi_{0.33}Co_{0.33}Mn_{0.33}O_2$ by Templated Sol-Gel Method

A templated sol-gel synthesis of $LiNi_{0.33}Co_{0.33}Mn_{0.33}O_2$ was conducted according to the invention. An aqueous solution of lithium nitrate, cobalt nitrate, nickel nitrate, manganese nitrate (in a molar ratio of 1:0.33:0.33:0.33) and citric acid was heated to between 55° C. and 60° C. in an open container with continuous stirring. The solution was stirred for a further 10 hours to obtain a homogeneous mixture, after which 40 wt % of the precursor solution was mixed with 60 wt % of CTAB. The mixture was stirred and a stable hexagonal mesophase was formed. The liquid crystal phase mixture was then transferred to a sealed sample bottle and heated to 60° C. The mixture was now a viscous liquid, which was stirred for a further 24-36 hours at 60° C. until it changed colour from light to deep purple. Heating was then continued for a few hours and the solution transferred to an alumina crucible where it was allowed to cool. The cooled solid/gel was then transferred to a furnace with constant heating for 10 hours at 900-950° C.

The resulting dark grey to black solid was ground to a fine powder and then characterised by XRD and BET.

The XRD trace showed a shift in peak positions to higher angles compared with the XRD trace for standard $LiCoO_2$. This suggested the formation of a homogeneous crystalline structure in which cobalt was partially substituted by manganese and nickel without changing the structure, in agreement with expectations.

The powder from the templated synthesis had a BET surface area of 14.3 m²/g, which represented a more than 10-fold increase in surface area compared with commercially available $LiNi_{0.33}Co_{0.33}Mn_{0.33}O_2$.

Electrical Performance Testing

Experiments were conducted to establish the electrochemical performance of the $LiCoO_2$ material made using the templated sol-gel method of the invention, and compare that performance with bench mark commercial $LiCoO_2$ and the material from the non-templated process.

Each of the aforementioned materials was fabricated into composite electrode coatings and tested in laboratory half-cells with a lithium foil anode. In order to establish the rate performance of the new material, the techniques of potential step analysis and Galvanostatic cycling were used.

Potential step analysis was used to establish the rate performance and power capability of the mesoporous materials. Potential step analysis consists of stepping up the voltage from open circuit voltage (OCV) to 4.2V for 5 hours corresponding to charge, and stepping it down to 3V in 5 hours corresponding to discharge. A material will be classed as high rate if it can deliver most of its capacity in short time i.e. in seconds.

Figure 7:
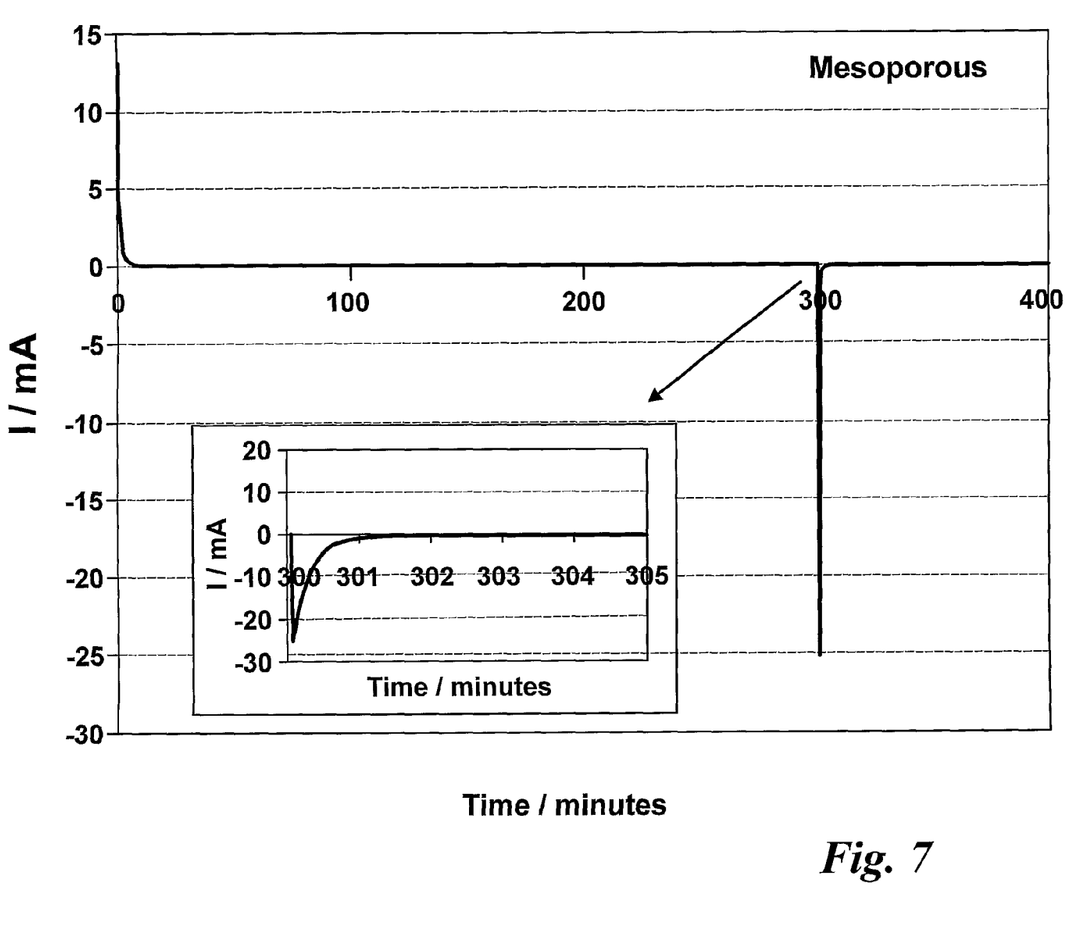
FIG. 7 shows a potential step trace for a cell comprising mesoporous $LiCoO_2$ produced by the method of the invention.

FIG. 7 shows the variation of current with time on a cell using mesoporous $LiCoO_2$ produced by the method of the invention, following a potential step from open circuit voltage (3.1V) to 4.2V and down to 3V. Profiles were also obtained for commercial $LiCoO_2$ and $LiCoO_2$ produced by a non-templated sol-gel method.

It was found that, for the commercial composite electrode, the current dropped quickly to zero after 20 minutes and, for the non-templated electrode, the current decayed to zero after 45 minutes. For the templated electrode, however, the current decayed to zero within only 2 minutes.

An important parameter is the amount of charge delivered by each individual electrode. By integrating the current/time profiles obtained from the potential step analysis, the amount of charge obtained when the cells were stepped down from 4.2 to 3 V was calculated. The results are summarised in Table 1, where it can be seen that the capacity exhibited by the mesoporous electrode after 36 seconds is 61 mAh g$^{-1}$ compared to 8.4 mAh g$^{-1}$ for the non-templated electrode and 16 mAh g$^{-1}$ for the commercial electrode. These results suggest that the mesoporous electrode should be able to deliver at least 70% of its capacity in around 36 seconds compared to a commercial electrode that can only deliver 11% of its capacity in the same time.

TABLE 1

Capacity obtained at different times from the beginning of pulses for mesoporous, non-templated and commercial $LiCoO_2$ electrode materials.

|  | Mesoporous electrode | Non-templated electrode | Commercial electrode |
| --- | --- | --- | --- |
| Capacity delivered in 90 minutes/mAh g$^{-1}$ | 103 | 93 | 133 |
| Capacity delivered in 60 minutes/mAh g$^{-1}$ | 100 | 73 | 131 |
| Capacity delivered in 30 minutes/mAh g$^{-1}$ | 95 | 38 | 127 |
| Capacity delivered in 0.6 minutes/mAh g$^{-1}$ | 61 | 8.4 | 16 |

Figure 8:
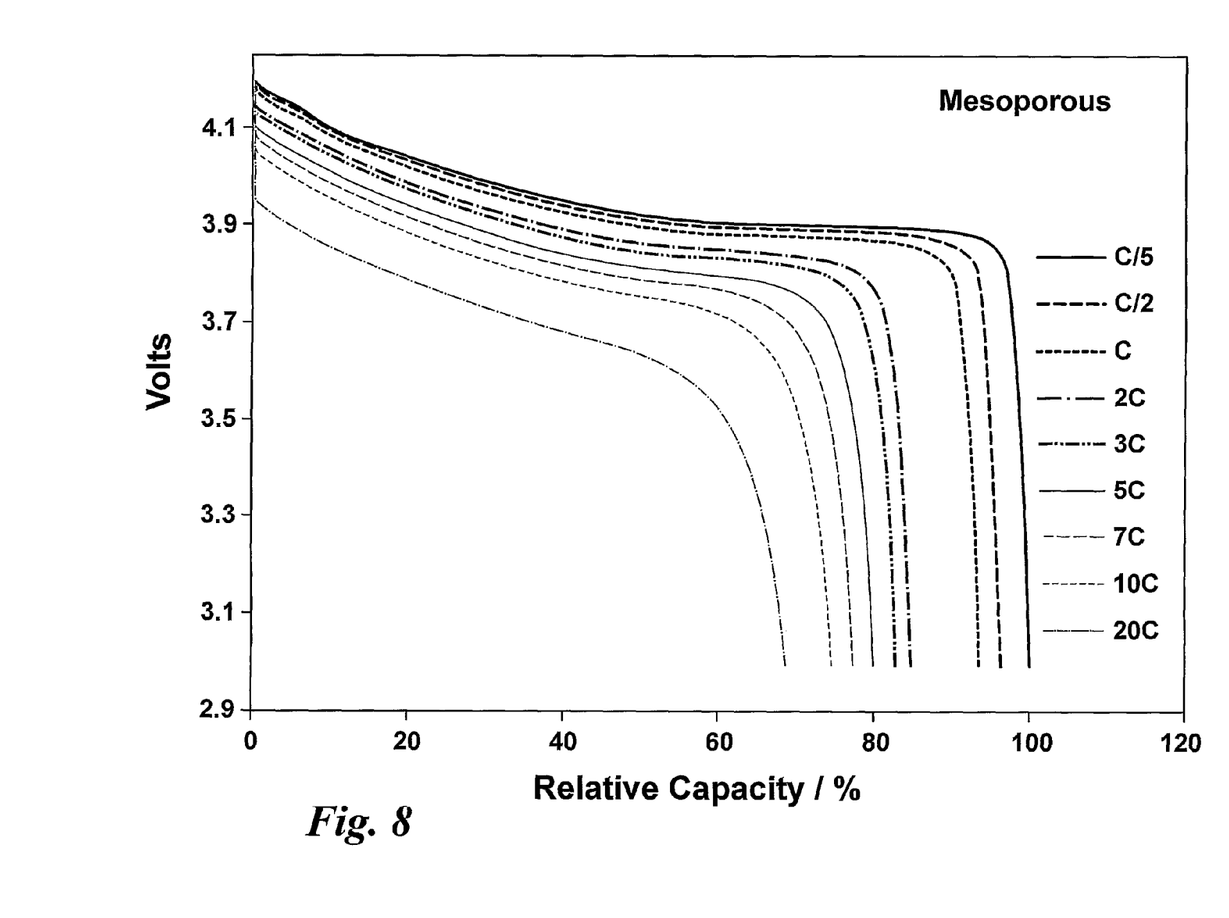
FIG. 8 shows a Galvanostatic discharge profile at different discharge rates for mesoporous $LiCoO_2$ produced by the method of the invention.

Galvanostatic cycling was also used to confirm the rate and power capability of the mesoporous electrode materials. The electrochemical cells were charged from OCV to 4.2V using constant current at a rate of C/5 (Charge in 5 hours), followed by discharging at different rates to 3V. The performance of the mesoporous composite electrode was again compared to the non-templated $LiCoO_2$ and commercially available $LiCoO_2$. Discharge profiles were obtained for the mesoporous electrode, non-templated electrode and commercial electrode at variable discharge rates and FIG. 8 shows the profiles for the mesoporous electrode, the capacity at variable rate being normalised with respect to the capacity obtained at C/5. In FIG. 8, the leftmost profile is the 20 C profile and the rightmost profile is the C/5 profile.

Figure 9:
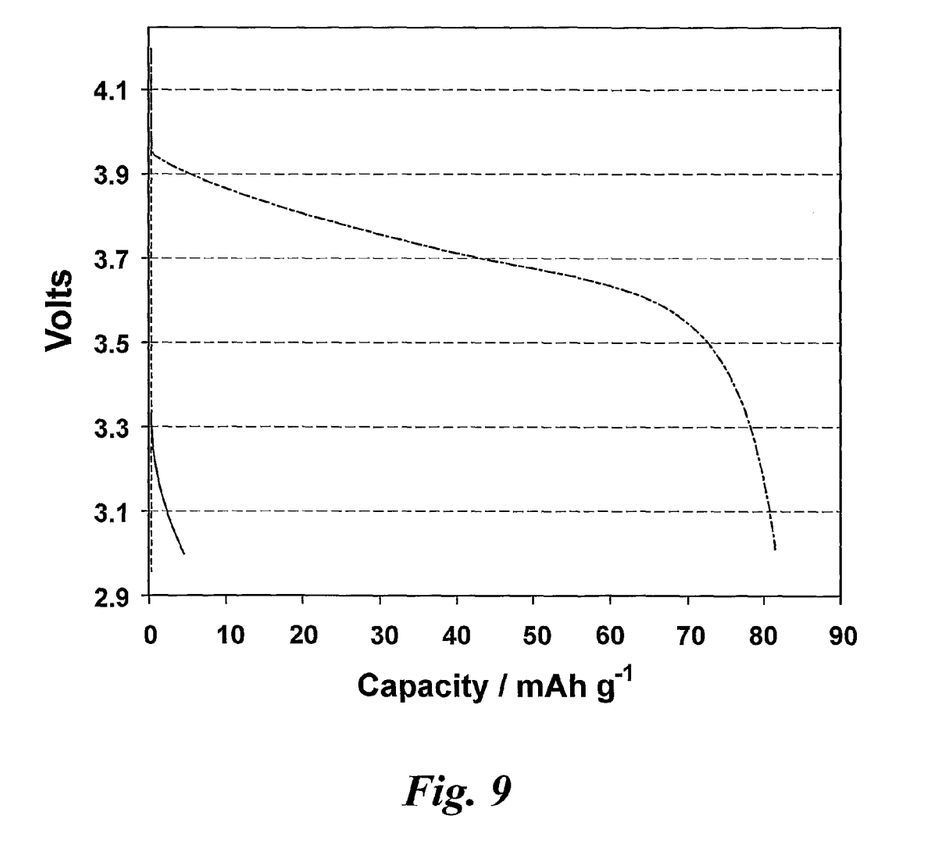
FIG. 9 shows Galvanostatic discharge profiles of templated (middle curve), non-templated (upper curve) and commercial (lower curve) $LiCoO_2$ electrode materials at 20 C rate.

The same observation was made regarding the superior rate performance of coated mesoporous materials over the non-templated and the commercial electrodes, notably at high rates. For instance, at a rate of 20 C (see FIG. 9) the capacity retention of the templated electrode was 70% compare to 16% for the non-templated electrode and 0% for the commercial electrode. These results are consistent with the results obtained from the potential step experiments where the highest charge was delivered for the templated electrode in 36 seconds.

Synthesis of Lithium Iron Phosphate by Templated Sol-Gel Method

A templated sol-gel synthesis of lithium iron phosphate ($LiFePO_4$) was conducted according to the invention. An aqueous solution of 0.5M lithium dihydrogen phosphate (Sigma Aldrich Inc.), 0.5M ferric citrate (Sigma Aldrich) and 1M citric acid was heated to between 55° C. and 60° C. in an open container with continuous stirring. The solution was stirred for a further 10 hours to obtain a homogeneous mixture, after which 100 ml of a molten solution of Brij® 56 (Sigma Aldrich Inc.) surfactant was added at 40° C. The mixture was then stirred until a hexagonal liquid crystal phase was formed. The liquid crystal phase mixture, which had the consistency of viscous paste, was then transferred to a sealed sample bottle and heated to 60° C. The mixture was now a viscous liquid, which was stirred for a further 24-36 hours at 60° C. Heating was then continued for a few hours and the solution transferred to an alumina crucible where it was allowed to cool.

The cooled solid/gel was then transferred to a furnace with constant heating for 16 hours at about 700° C. under an argon atmosphere. The templated sol-gel synthesis was conducted in a sealed container because water loss was observed to lead to the destruction of the hexagonal phase of the liquid crystal and hence, the collapse of the pore structure morphology.

Figure 10:
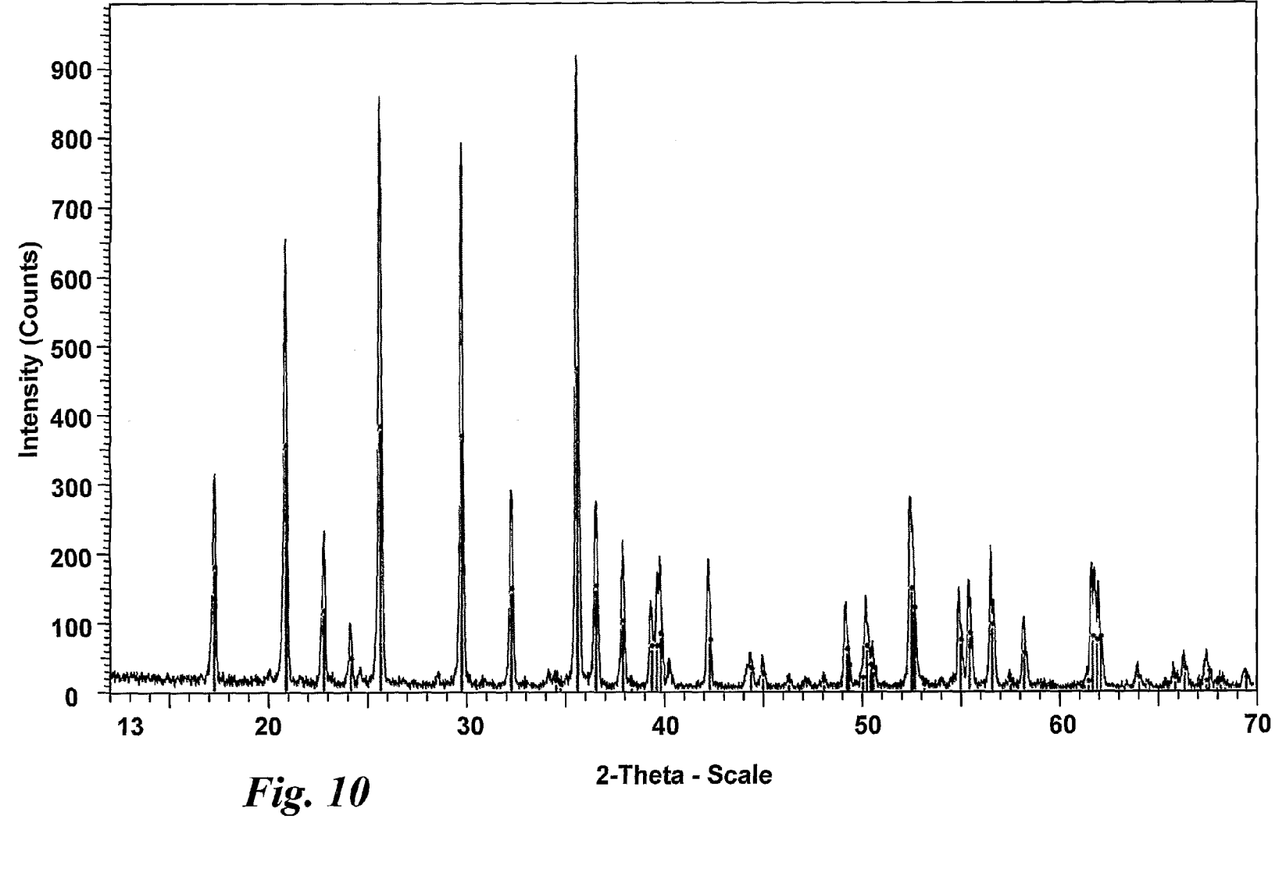
FIG. 10 shows an XRD pattern of $LiFePO_4$ produced by a templated sol-gel synthesis according to the invention.

The resulting dark grey to black solid was ground to a fine powder and then characterised by XRD. The XRD trace (FIG. 10) confirmed the purity of lithium iron phosphate. It was found that the calcination temperature could be varied between 450° C. and 700° C. to optimise the mesoporosity of the LiFePO$_4$ product.

The invention claimed is:

1. A method for the synthesis of a mesoporous lithium transition metal compound by a liquid crystal templating method, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous product, wherein the surfactant concentration in the reaction mixture lies in the range of 40-60 wt %, and wherein a lyotropic liquid crystal phase is formed in the reaction mixture and maintained through steps (i) and (ii) by controlling the reaction conditions to prevent destabilisation thereof.

2. A method according to claim 1, wherein the metal compound is an oxide, a phosphate, a borate or a silicate.

3. A method according to claim 2, wherein the metal compound is a phosphate, a borate or a silicate and an additional phosphate, borate or silicate reagent is added to the reaction mixture at step (i).

4. A method according to claim 1, wherein the lithium salt and one or more transition metal salts form a polymeric metal phosphorus oxygen network at step (ii), thereby forming a mesoporous lithium transition metal phosphate product.

5. A method according to claim 4, wherein a lithium salt is reacted with an iron salt and a phosphate under acidic conditions so as to produce mesoporous LiFePO$_4$.

6. A method according to claim 4, wherein lithium dihydrogen phosphate is reacted with an iron salt to produce mesoporous LiFePO$_4$.

7. A method according to claim 1, wherein the lithium salt and one or more transition metal salts form a polymeric metal oxide network at step (ii), thereby forming a mesoporous lithium transition metal oxide product.

8. A method according to claim 7, wherein a lithium salt is reacted with a cobalt salt and one or more further transition metal salts at step (i) so as to form a compound lithium cobalt oxide.

9. A method according to claim 8, wherein the one or more further salts comprise a transition metal selected from the group consisting of Ni, Mn and Al.

10. A method according to claim 8, where the mesoporous oxide product is a compound lithium cobalt oxide selected from the group consisting of LiCoMnO$_2$, LiCoNiO, LiCoAlO$_2$ and LiNi$_{0.33}$Co$_{0.33}$Mn$_{0.33}$O$_2$.

11. A method according to claim 7, wherein a lithium salt is reacted with a cobalt salt at step (i) so as to form mesoporous LiCoO$_2$.

12. A method according to claim 11, wherein the lithium salt is lithium nitrate and the cobalt salt is cobalt nitrate.

13. A method according to claim 11, wherein the surfactant is removed by calcining and wherein the calcining temperature lies in the range 400 to 700° C.

14. A method according to claim 11, wherein a lithium salt is reacted with a cobalt salt to produce a mesoporous LiCoO$_2$ product and wherein the reactants are heated in the range 50° to 60° C. at step (ii).

15. A method according to claim 1, wherein the surfactant is removed by calcining.

16. A method according to claim 1, wherein the liquid crystal phase is a hexagonal phase.

17. A method according to claim 1, wherein the surfactant is selected from the group consisting of polyoxyethylene cetyl ether, octaethylene ether and CTAB.

18. A method according to claim 1, wherein the reaction takes place in an aqueous solvent.

19. A method according to claim 1, wherein water loss is controlled at steps (i) and (ii) so as to prevent destabilisation of the liquid crystal phase.

20. A method according to claim 19, wherein water loss is substantially prevented.

21. A method according to claim 1, wherein the reaction mixture additionally comprises a chelating agent.

22. A method according to claim 1, wherein the lithium salt is lithium nitrate.

23. A method according to claim 1, wherein the one or more transition metal salts are nitrate salts.

24. A method for the synthesis of a mesoporous lithium transition metal compound, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous product, wherein a lithium salt is reacted with a cobalt salt at step (i) so as to form mesoporous LiCoO$_2$ and wherein the reactants are heated in the range 50° to 60° C. at step (ii).

25. A method for the synthesis of a mesoporous lithium transition metal compound by a liquid crystal templating method, the method comprising the steps of (i) reacting a lithium salt with one or more transition metal salts in the presence of a surfactant, the surfactant being present in an amount sufficient to form a liquid crystal phase in the reaction mixture (ii) heating the reaction mixture so as to form a sol-gel and (iii) removing the surfactant to leave a mesoporous product, wherein the surfactant concentration in the reaction mixture lies in the range of 40-60 wt % and wherein the reaction takes place in an aqueous solvent and wherein water loss is controlled at steps (i) and (ii) so as to prevent destabilisation of the liquid crystal phase and wherein a lyotropic liquid crystal phase is formed in the reaction mixture and maintained through steps (i) and (ii).

* * * * *